US008983042B1

(12) United States Patent
Ho et al.

(10) Patent No.: US 8,983,042 B1
(45) Date of Patent: *Mar. 17, 2015

(54) SYSTEM TO RECORD AND ANALYZE VOICE MESSAGE USAGE INFORMATION

(71) Applicant: TP Lab, Inc., Palo Alto, CA (US)

(72) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/251,625

(22) Filed: Apr. 13, 2014

Related U.S. Application Data

(63) Continuation of application No. 13/943,321, filed on Jul. 16, 2013, now Pat. No. 8,737,582, and a continuation of application No. 13/095,884, filed on Apr. 28, 2011, now Pat. No. 8,515,032, and a continuation of application No. 11/250,763, filed on Oct. 13, 2005, now Pat. No. 7,961,854.

(51) Int. Cl.
*H04M 1/64* (2006.01)

(52) U.S. Cl.
USPC ......................................... 379/88.25; 379/68

(58) Field of Classification Search
USPC ................. 379/67.1, 68, 88.08, 88.09, 88.16, 379/88.22, 88.25, 88.27
See application file for complete search history.

(56) References Cited

U.S. PATENT DOCUMENTS

| 5,790,637 | A | * | 8/1998 | Johnson et al. | ............ 379/88.04 |
|---|---|---|---|---|---|
| 6,005,922 | A | * | 12/1999 | Longster et al. | ........... 379/88.18 |
| 6,069,940 | A | * | 5/2000 | Carleton et al. | ........... 379/88.04 |
| 6,697,796 | B2 | * | 2/2004 | Kermani | .................... 379/88.14 |
| 6,999,566 | B1 | * | 2/2006 | Eason et al. | ................ 379/88.22 |
| 7,457,398 | B2 | * | 11/2008 | Candell et al. | ............. 379/88.23 |
| 7,606,706 | B1 | * | 10/2009 | Rubin et al. | .................. 704/235 |
| 8,285,255 | B2 | * | 10/2012 | Vander Veen et al. | ..... 455/412.2 |
| 2003/0128820 | A1 | * | 7/2003 | Hirschberg et al. | ........ 379/88.14 |
| 2005/0069095 | A1 | * | 3/2005 | Fellenstein et al. | ........ 379/88.02 |
| 2007/0081636 | A1 | * | 4/2007 | Shaffer et al. | ................... 379/80 |

* cited by examiner

*Primary Examiner* — Olisa Anwah
(74) *Attorney, Agent, or Firm* — North Shore Patents, P.C.; Michele Liu Baillie

(57) ABSTRACT

A voice message system records voice message usage information by creating voice message records when a voice message is sent and when it is received. The voice message record includes: the voice message, a voice message sender identity, a voice message recipient identity, and voice message action records. A voice message action records includes a voice message action that specifies an action on the voice message, and a voice message action time that includes the time at which the action occurs. Voice message actions include sent, received, and listened. The system further includes a voice message analyzer for analyzing voice message records, and a voice message reporter for generating reports from an analysis by the analyzer. The voice message system provides tractable information for voice messages, allowing companies to enforce a voice message usage policy.

26 Claims, 8 Drawing Sheets

A Process to record sending information about a Voice Message

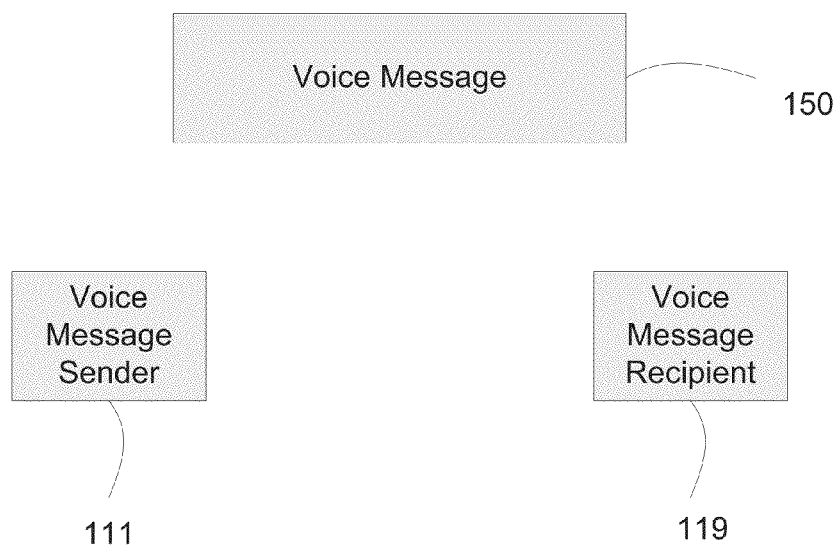
Figure 1. Voice Message, Voice Message Sender and Voice Message Recipient

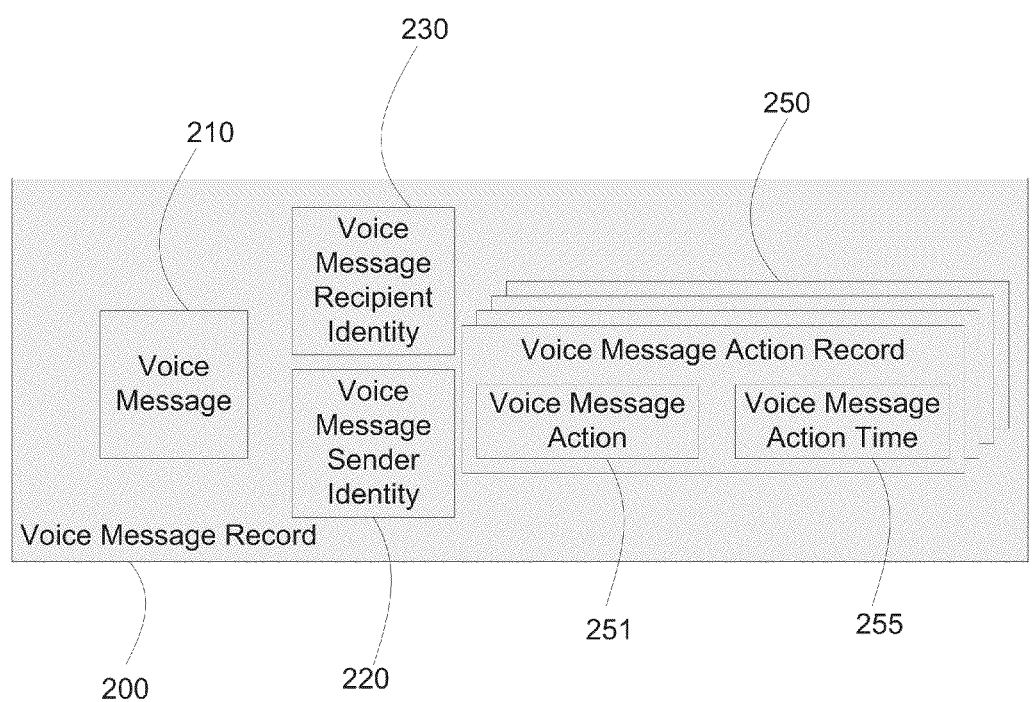
Figure 2. Voice Message Record

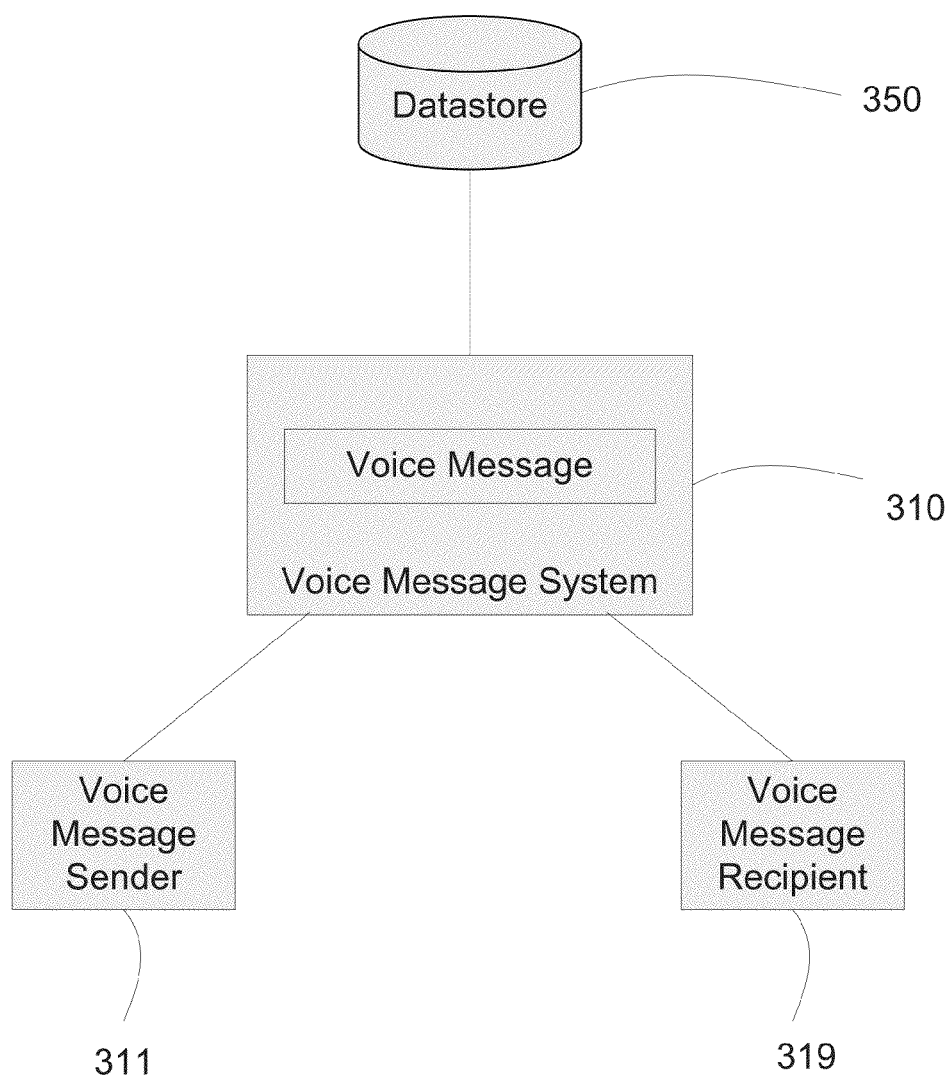
Figure 3. Voice Message System

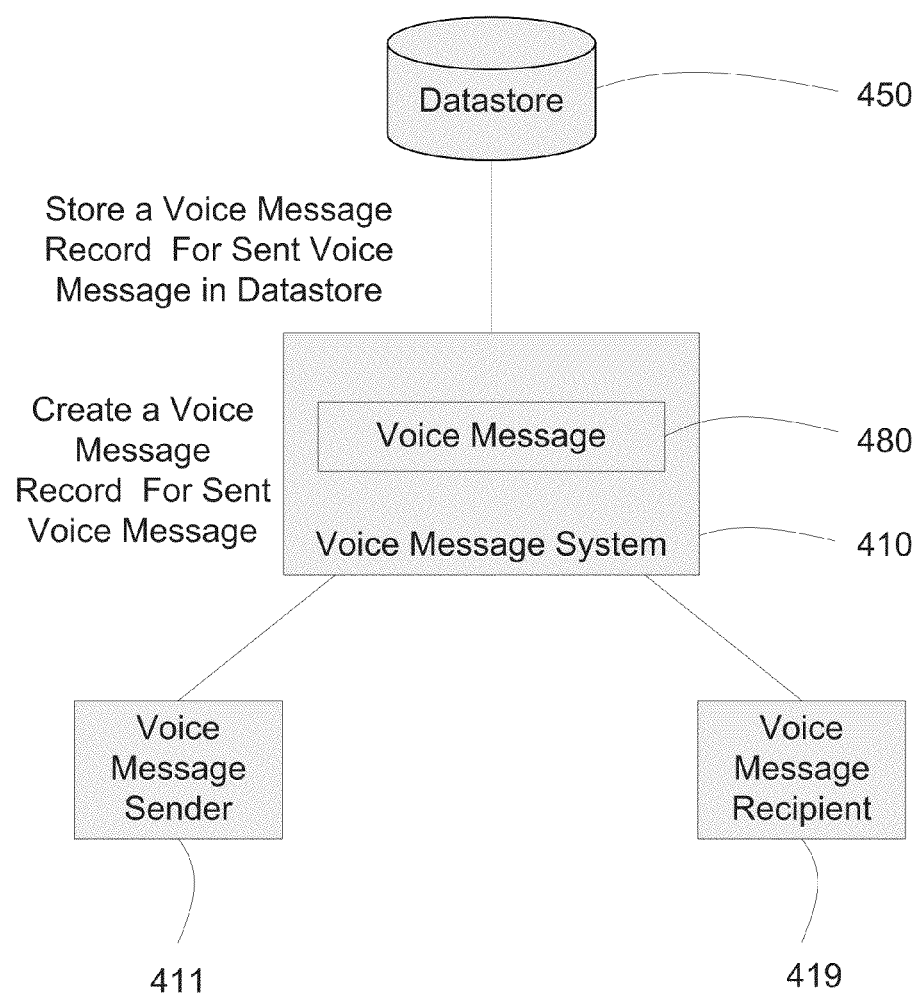
Figure 4. A Process to record sending information about a Voice Message

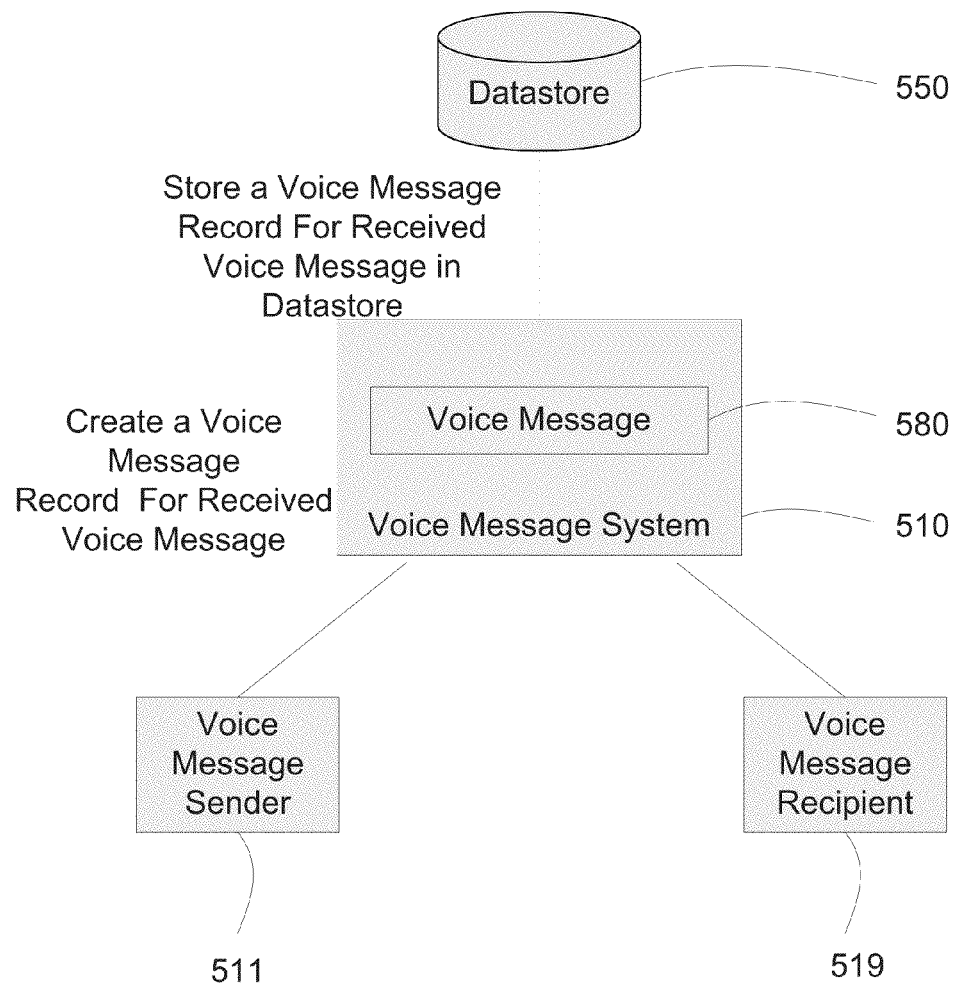
Figure 5. A Process to record receiving information about a Voice Message

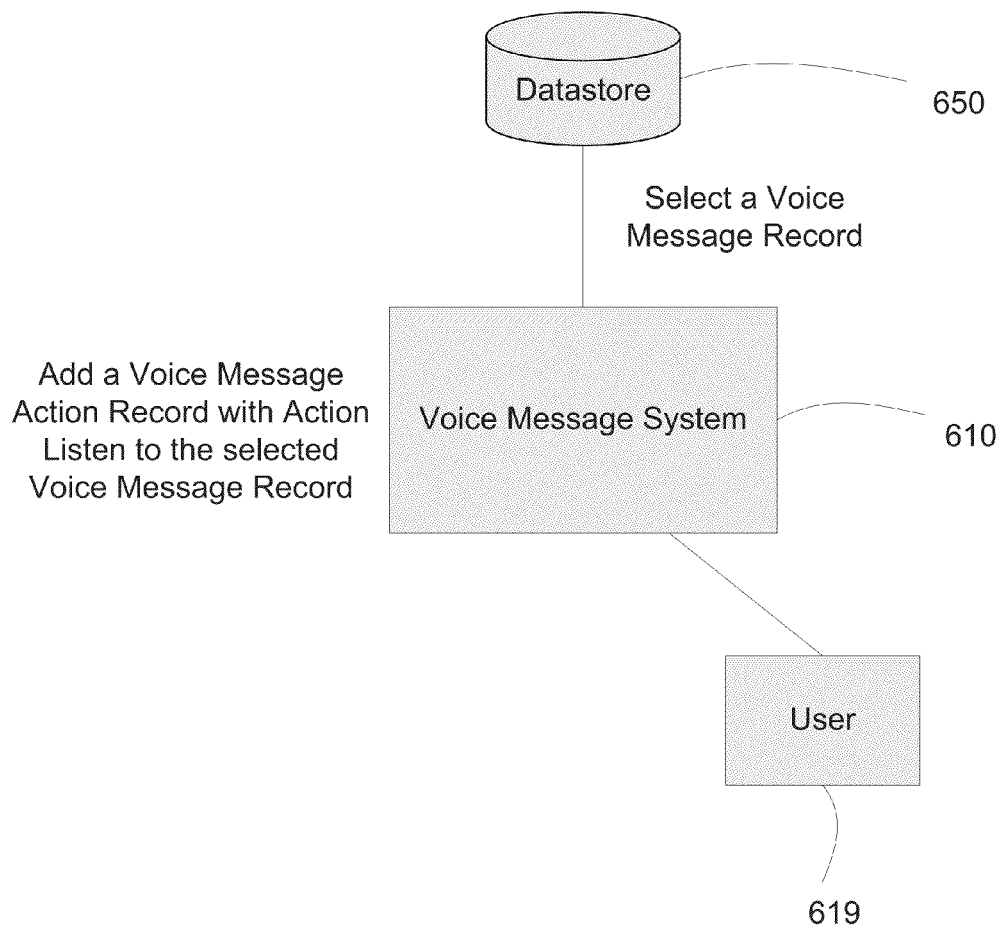
Figure 6. A Process to record listening information about to a Voice Message

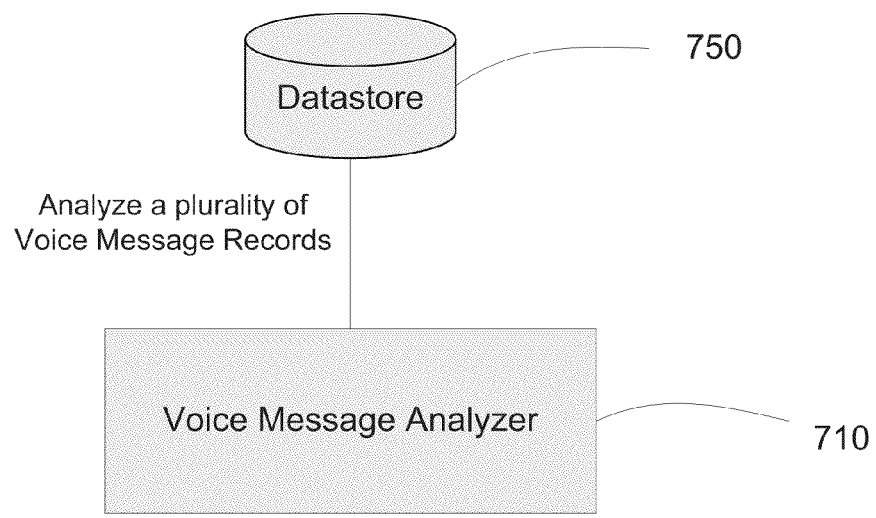
Figure 7. A Process of analyzing a plurality of Voice Messages

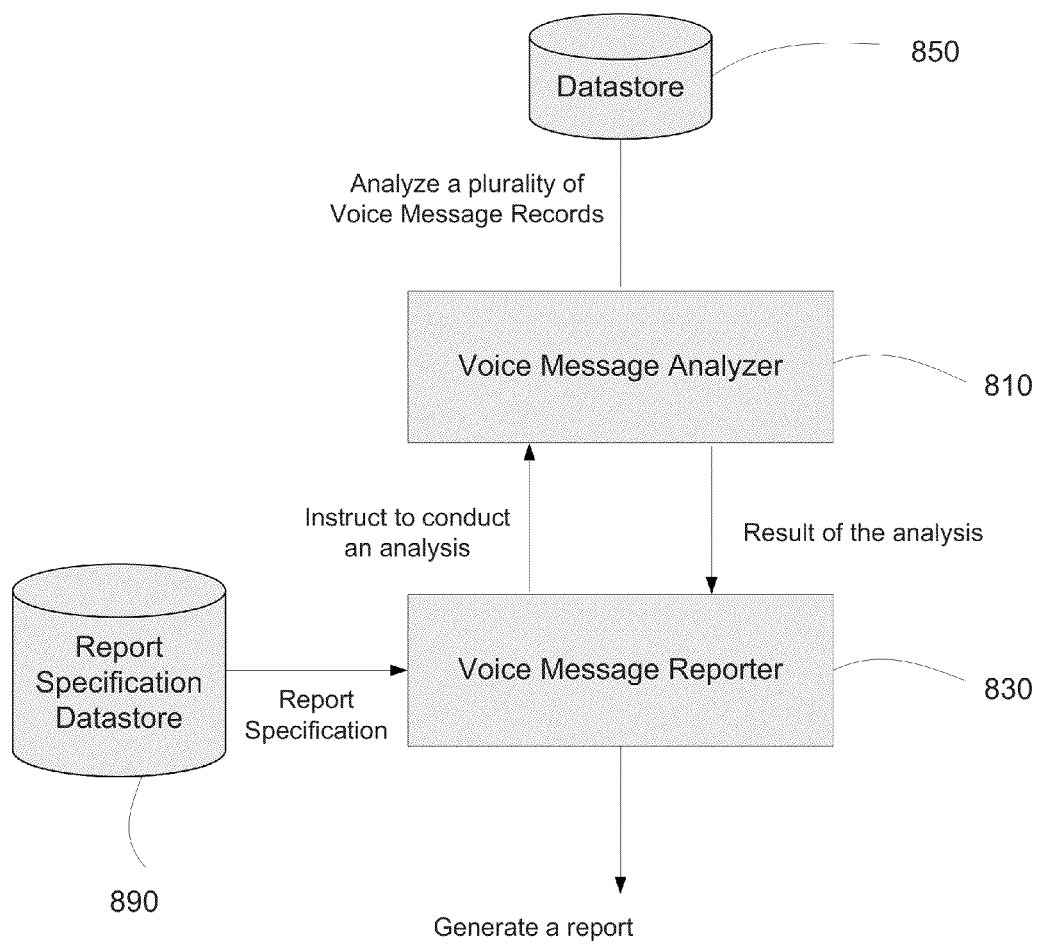
Figure 8. A Process of reporting on a plurality of Voice Messages

SYSTEM TO RECORD AND ANALYZE VOICE MESSAGE USAGE INFORMATION

CROSS-REFERENCE TO RELATED APPLICATIONS

The present application is a continuation of co-pending U.S. patent application Ser. No. 13/943,321, filed on Jul. 16, 2013; which in turn is a continuation of U.S. patent application Ser. No. 13/095,884, filed on Apr. 28, 2011, issued as U.S. Pat. No. 8,515,032 on Aug. 20, 2013; which in turn is a continuation of U.S. patent application Ser. No. 11/250,763, filed on Oct. 13, 2005, issued as U.S. Pat. No. 7,961,854 on Jun. 14, 2011.

BACKGROUND OF THE INVENTION

1. Field

This invention relates generally to telecommunications, and more specifically, to a system to record and analyze voice message usage information.

2. Related Art

Voice mail systems, also known as voice message systems, gained popularity in the corporate world since its introduction in late 1970s. A user can leave a voice message at a voice mail system for another user without the assistance of an attendant or a secretary. Likewise, a user can listen to his or her voice messages from a voice mail system without the assistance of an attendant or a secretary.

Voice mail systems have since become an essential communications tool for businesses, government agencies, education institutions and communities. While providing convenience for the users to conduct business and for personal use, the usage of voice messages for communications creates a set of privacy problems.

In one example, John works for Central Realtors as a real estate broker. John uses the company's voice message system for both business and personal purposes. The company publishes a voice message usage policy, which respects the privacy of its employees. However, there is no tractable information to allow the company to distinguish between a business voice message and a personal voice message in order to apply usage measures as stated.

In another example, the management of Corner Technologies suspects that an employee has been leaking proprietary information to a competitor, and would like to collect evidence, including the employee's voice messages between Aug. 10 and Aug. 22, 2003. However, the employee has already deleted these voice messages, and there is no consistent backup procedure to ensure the availability of deleted voice messages.

Accordingly, there exists a need for a method and system for recording and analyzing voice message usage information. The present invention addresses such a need.

BRIEF SUMMARY OF THE INVENTION

A voice message system records voice message usage information by creating voice message records when a voice message is sent and when it is received. The voice message record includes: the voice message, a voice message sender identity, a voice message recipient identity, and voice message action records. A voice message action records includes a voice message action that specifies an action on the voice message, and a voice message action time that includes the time at which the action occurs. Voice message actions include sent, received, and listened. The system further includes a voice message analyzer for analyzing voice message records, and a voice message reporter for generating reports from an analysis by the analyzer. The voice message system provides tractable information for voice messages, allowing companies to enforce a voice message usage policy.

BRIEF DESCRIPTION OF THE SEVERAL VIEWS OF THE FIGURES

FIG. 1 illustrates a Voice Message, a Voice Message Sender, and a Voice Message Recipient.

FIG. 2 illustrates a Voice Message Record.

FIG. 3 illustrates a Voice Message System.

FIG. 4 illustrates a process to record sending information about a Voice Message.

FIG. 5 illustrates a process to record receiving information about a Voice Message.

FIG. 6 illustrates a process to record listening information about Voice Message.

FIG. 7 illustrates a process of analyzing a plurality of Voice Message Records.

FIG. 8 illustrates a process of reporting on a plurality of Voice Message Records.

DETAILED DESCRIPTION OF THE INVENTION

FIG. 1 illustrates a Voice Message 150, a Voice Message Sender 111 and a Voice Message Recipient 119. Voice Message 150 includes a recorded spoken message from Voice Message Sender 111 to Voice Message Recipient 119.

FIG. 2 illustrates a Voice Message Record. A Voice Message Record includes usage information about a Voice Message.

A Voice Message Record 200 includes a Voice Message 210, a Voice Message Sender Identity 220, a Voice Message Recipient Identity 230, and a plurality of Voice Message Action Records 250.

Voice Message Sender Identity 220 identifies the Voice Message Sender 111 who sends a Voice Message 210. Voice Message Recipient Identity 230 identifies the Voice Message Recipient 119 who receives the Voice Message 210.

A Voice Message Action Record 250 records one or more actions on Voice Message 210.

A Voice Message Action Record 250 includes a Voice Message Action 251 that specifies the action, and a Voice Message Action Time 255 that includes the time at which the action indicated in Voice Message Action 251 occurs. In one embodiment, Voice Message Action Time 255 includes the time of day at which the action occurs. In another embodiment, Voice Message Action Time 255 includes the time period during which the action occurs.

FIG. 3 illustrates a Voice Message System.

Voice Message System 310 connects to a Datastore 350. Datastore 350 stores a plurality of Voice Message Records. A Voice Message Sender 311 connects to Voice Message System 310 to send a Voice Message. A Voice Message Recipient 319 connects to a Voice Message System 310 to listen to a Voice Message.

Voice Message System 310 includes a plurality of processes. One embodiment includes processes to record sending information, receiving information, or listening information about a Voice Message. One embodiment includes processes of analyzing or reporting on the plurality of Voice Message Records. The processes are discussed in subsequent illustrations.

FIG. 4 illustrates a process to record sending information about a Voice Message.

A Voice Message Sender 411 connects to a Voice Message System 410 and sends a Voice Message 480. The recipient of Voice Message 480 is Voice Message Recipient 419. Voice Message System 410 receives Voice Message 480. Voice Message System 410 creates a Voice Message Record.

Voice Message System 410 includes Voice Message 480 in the Voice Message Record for the sent Voice Message.

Voice Message System 410 includes a Voice Message Sender Identity of Voice Message Sender 411 in the Voice Message Record.

In one embodiment, Voice Message Sender 411 connects to Voice Message System 410 in a telephone call via a telephone system. In one embodiment, the telephone system provides to Voice Message System 410 a telephone extension number of the telephone used in the connection. Voice Message System 410 includes the telephone extension number in the Voice Message Sender Identity. In one embodiment, Voice Message System 410 obtains a user name based on the telephone extension number. Voice Message System 410 includes the user name in the Voice Message Sender Identity. In another embodiment, the telephone system provides Voice Message System 410 the calling party telephone number of the telephone call. Voice Message System 410 includes the calling party telephone number in the Voice Message Sender Identity. In one embodiment, the telephone system provides Voice Message System 410 the caller identity of the telephone call. Voice Message System 410 includes the caller identity in the Voice Message Sender Identity. In one other embodiment, Voice Message System 410 prompts Voice Message Sender 411 for information about Voice Message Sender 411. Voice Message Sender 411 provides Voice Message System 410 the information. Voice Message System 410 includes the information in the Voice Message Sender Identity. In one embodiment, the information includes a user identity for the Voice Message Sender 411.

In another embodiment, Voice Message Sender 411 connects to Voice Message System 410 via an electronic message system. Voice Message Sender 411 sends Voice Message 480 in an electronic message. In one embodiment, the electronic message system provides Voice Message System 410 a sender identity of the electronic message.

Voice Message System 410 includes the sender identity in the Voice Message Sender Identity.

Voice Message System 410 includes a Voice Message Recipient Identity of Voice Message Recipient 419 in the Voice Message Record.

In one embodiment, Voice Message Sender 411 connects to Voice Message System 410 in a telephone call via a telephone system. In one embodiment, the telephone system provides Voice Message System 410 the digits Voice Message Sender 411 dials when setting up the telephone call. Voice Message System 410 includes the dialed digits in the Voice Message Recipient Identity. In another embodiment, Voice Message System 410 prompts Voice Message Sender 411 for information about Voice Message Recipient 419. Voice Message Sender 411 provides Voice Message System 410 the information. Voice Message System 410 includes the information in the Voice Message Recipient Identity. In one embodiment, the information includes a user identity for the Voice Message Recipient 419.

In another embodiment, Voice Message Sender 411 connects to Voice Message System 410 via an electronic message system. Voice Message Sender 411 sends Voice Message 480 in an electronic message. In one embodiment, the electronic message system provides Voice Message System 410 a recipient identity of the electronic message.

Voice Message System 410 includes the recipient identity in the Voice Message Recipient Identity.

Voice Message System 410 further includes in the Voice Message Record a Voice Message Action Record with Voice Message Action set to Action Send. In one embodiment, Voice Message System 410 includes the current time of day in the Voice Message Action Time of the Voice Message Action Record. In another embodiment, the electronic message system provides Voice Message System 410 a sending time. The sending time is the time of day when Voice Message Sender 411 sends the electronic message that includes Voice Message 480. Voice Message System 410 includes the sending time in the Voice Message Action Time of the Voice Message Action Record.

In one embodiment, the Voice Message Sender Identity in a Voice Message Record indicates the location of the Voice Message Sender 411 identified by the Voice Message Sender Identity at the time when the Voice Message Sender 411 sends the Voice Message 480 that is included in the Voice Message Record. In one embodiment, the Voice Message Sender Identity includes a telephone extension number. In one embodiment, the telephone extension number indicates the location based on a telephone wiring plan of a Private Branch Exchange (PBX) that connects to the telephone extension. In one embodiment, the location is a cubicle. In another embodiment, the location is a conference room. In one other embodiment, the location is the front lobby of a building. In another embodiment, the Voice Message Sender Identity includes a calling party telephone number. In one embodiment, the calling party indicates the location based on information about the telephone service associated with the telephone number. In one embodiment, the telephone service is a residential telephone service; the location is a street address of the service subscription. In another embodiment, the telephone service is a mobile telephone service; the location is a street address of a wireless base station that serves the telephone call the Voice Message Sender 411 uses to send the Voice Message 480.

In one embodiment, Voice Message System 410 stores the Voice Message Record in Datastore 450. In one embodiment, Datastore 450 is a flash memory. In another embodiment, Datastore 450 is a hard disk. In yet another embodiment, Datastore 450 is a memory. In one other embodiment, Datastore 450 is a database. In one embodiment, Voice Message System 410 includes the Datastore 450.

FIG. 5 illustrates a process to record receiving information about a Voice Message.

When Voice Message System 510 receives a Voice Message 580 from a Voice Message Sender 511 for a Voice Message Recipient 519, Voice Message System 510 creates a Voice Message Record.

Voice Message System 510 includes Voice Message 580 in the Voice Message Record.

Voice Message System 510 includes a Voice Message Sender Identity of Voice Message Sender 511 in the Voice Message Record.

In one embodiment, Voice Message Sender 511 connects to Voice Message System 510 in a telephone call via a telephone system. In one embodiment, the telephone system provides Voice Message System 510 a telephone extension number of the telephone used in the connection. Voice Message System 510 includes the telephone extension number in the Voice Message Sender Identity. In one embodiment, Voice Message System 510 obtains a user name based on the telephone extension number. Voice Message System 510 includes the user name in the Voice Message Sender Identity. In another embodiment, the telephone system provides Voice Message System 510 the calling party telephone number of the telephone call. Voice Message System 510 includes the calling party telephone number in the Voice Message Sender Identity. In one embodiment, the telephone system provides Voice Message System 510 the caller identity of the telephone call. Voice Message System 510 includes the caller identity in the Voice Message Sender Identity. In one other embodiment, Voice Message System 510 prompts Voice Message Sender 11 for information about Voice Message Sender 511. Voice Message Sender 511 provides Voice Message System 510 the information. Voice Message System 510 includes the information in the Voice Message Sender Identity. In one embodiment, the information includes a user identity for the Voice Message Sender 511.

In another embodiment, Voice Message Sender 511 connects to Voice Message System 510 via an electronic message system. Voice Message Sender 511 sends Voice Message 580 in an electronic message. In one embodiment, the electronic message system provides Voice Message System 510 a sender identity of the electronic message.

Voice Message System 510 includes the sender identity in the Voice Message Sender Identity.

Voice Message System 510 includes a Voice Message Recipient Identity of Voice Message Recipient 519 in the Voice Message Record.

In one embodiment, Voice Message Sender 511 connects to Voice Message System 510 in a telephone call via a telephone system. In one embodiment, the telephone system provides Voice Message System 510 the digits the phone system receives for setting up the telephone call. Voice Message System 510 includes the received digits in the Voice Message Recipient Identity. In one embodiment, Voice Message System 510 maps the received digits to a telephone extension number. Voice Message System 510 includes the telephone extension number in the Voice Message Recipient Identity. In one embodiment, Voice Message System 510 obtains a user name based on the telephone extension number. Voice Message System 510 includes the user name in the Voice Message Recipient Identity. In another embodiment, Voice Message System 510 obtains a user name based on the received digits. Voice Message System 510 includes the user name in the Voice Message Recipient Identity. In one other embodiment, Voice Message System 510 prompts Voice Message Sender 511 for information about Voice Message Recipient 519. Voice Message Sender 511 provides Voice Message System 510 the information. Voice Message System 510 includes the information in the Voice Message Recipient Identity. In one embodiment, the information includes a user identity for the Voice Message Recipient 519.

In another embodiment, Voice Message Sender 511 connects to Voice Message System 510 via an electronic message system. Voice Message Sender 511 sends Voice Message 580 in an electronic message. In one embodiment, the electronic message system provides Voice Message System 510 a recipient identity of the electronic message. Voice Message System 510 includes the recipient identity in the Voice Message Recipient Identity.

Voice Message System 510 further includes a Voice Message Action Record in the Voice Message Record with Voice Message Action set to Action Receive. In one embodiment, Voice Message System 510 includes the current time of day in the Voice Message Action Time of the Voice Message Action Record. In one embodiment, Voice Message 580 is sent to more than one Voice Message Recipient. A Voice Message Action Record would then be created for the Voice Message received by each Voice Message Recipient.

In one embodiment, Voice Message System 510 stores the Voice Message Record in Datastore 550. In one embodiment, Datastore 550 is a flash memory. In another embodiment, Datastore 550 is a hard disk. In yet another embodiment, Datastore 550 is a memory. In one other embodiment, Datastore 550 is a database. In one embodiment, Voice Message System 510 includes the Datastore 550.

FIG. 6 illustrates a process to record listening information about Voice Message.

In one embodiment, a User 619 connects to Voice Message System 610. User 619 submits to Voice Message System 610 an identity. In one embodiment, Voice Message System 610 selects from Datastore 650 a Voice Message Record with Voice Message Recipient Identity matching the submitted identity, and that includes a Voice Message Action Record with Voice Message Action of Action Receive.

Voice Message System 610 updates the selected Voice Message Record with a Voice Message Action Record. The Voice Message Action Record has Voice Message Action set to Action Listen. In one embodiment, Voice Message System 610 updates the selected Voice Message Record after the Voice Message Record is selected. In one embodiment, Voice Message System 610 updates the selected Voice Message Record after User 619 listens to the Voice Message included in the selected Voice Message Record. In one embodiment, Voice Message System 610 includes in the Voice Message Action Time of the Voice Message Action Record the time of day when User 619 listens to the Voice Message. In one embodiment, Voice Message System 610 includes in the Voice Message Action Time of the Voice Message Action Record the time period during when User 619 listens to the Voice Message. In one embodiment, User 619 deletes the Voice Message after listening to the Voice Message. Voice Message System 610 includes a Voice Message Action Record in the Voice Message Record with Voice Message Action set to Action Delete. In one embodiment, User 619 forwards the Voice Message to another Voice Message Recipient. Voice Message System 610 includes a Voice Message Action Record in the Voice Message Record with Voice Message Action set to Action Forward. In one embodiment, Voice Message System 610 additionally creates a new Voice Message Record for the forwarded Voice Message with Voice Message Action Record set to Action Sent.

In one embodiment, when a User 619 wants to listen to a voice message, Voice Message System 610 selects a voice message that has not been listened to. In this embodiment, Voice Message System 610 selects from Datastore 650 a Voice Message Record that includes a Voice Message Recipient Identity matching the identity submitted by the User 619, and that includes a Voice Message Action Record with Voice Message Action of Action Receive, and that does not include a Voice Message Action Record with Voice Message Action of Action Listen.

In another embodiment, when a User 619 wants to listen to a voice message, Voice Message System 650 selects a voice message even if the voice message has been listened to. Voice Message System 610 selects from Datastore 650 a Voice Message Record that includes a Voice Message Recipient Identity matching the identity submitted by the User 619, and that includes a Voice Message Action Record with Voice Message Action of Action Receive. Each time the User 619 listens to the Voice Message included in the selected Voice Message Record, Voice Message System 610 adds a Voice Message Action Record to the selected Voice Message Record.

In one embodiment, Voice Message Action Record includes a User Action Attribute. In one embodiment, User Action Attribute includes information about the connection over which a User 619 listens to a voice message. In one embodiment, the information about the connection indicates the location where the User 619 listens to the voice message. In one embodiment, a User 619 connects to Voice Message System 610 in a telephone call via a telephone system to listen to a voice message. In one embodiment, the telephone system provides Voice Message System 610 a telephone extension number of the telephone used in the connection. Voice Message System 610 includes the telephone extension number in the User Action Attribute. In another embodiment, the telephone system provides Voice Message System 610 a calling party telephone number of the telephone call. Voice Message System 610 includes the calling party telephone number in the User Action Attribute. In yet another embodiment, the telephone system provides Voice Message System 610 a caller identity of the telephone call. Voice Message System 610 includes the caller identity in the User Action Attribute.

In one embodiment, User Action Attribute includes the identity of a first User who listens to a voice message for a second User. In one embodiment, a first User connects to Voice Message System 610 to listen to a voice message. The first User submits to Voice Message System 610 an identity of the first User and an identity of a second User. Voice Message System 610 selects a Voice Message Record with Voice Message Recipient Identity matching the identity of the second User. Voice Message System 610 updates the selected Voice Message Record with a Voice Message Action Record. Voice Message System 610 includes the identity of the first User in the User Action Attribute. In this embodiment, a manager can delegate to her secretary to listen to her voice messages with proper recording of usage information.

In one embodiment, Voice Message System 610 stores the updated Voice Message Record in Datastore 650. In one embodiment, Datastore 650 is a flash memory. In another embodiment, Datastore 650 is a hard disk. In yet another embodiment, Datastore 650 is a memory. In one other embodiment, Datastore 650 is a database. In one embodiment, Voice Message System 610 includes the Datastore 650.

FIG. 7 illustrates a process of analyzing a plurality of Voice Message Records.

Voice Message System includes a Voice Message Analyzer 710. Voice Message Analyzer 710 connects to Datastore 750. Voice Message Analyzer 710 analyses a plurality of Voice Message Records regarding usage information. In one embodiment, the analysis answers a query. In one embodiment, the result of the analysis is for generating a report.

In one embodiment, Voice Message Analyzer 710 answers the query "Who has received a voice message from John Smith?" Voice Message Analyzer 710 selects from Datastore 750 all Voice Message Record with Voice Message Sender Identity that matches the name "John Smith", and that includes a Voice Message Action Record with Voice Message Action of Action Receive. Voice Message Analyzer 710 extracts from the selected zero or more Voice Message Record the Voice Message Recipient Identity as the result of the analysis. In one embodiment, John Smith uses a plurality of telephones to send voice messages, Voice Message Analyzer 710 matches the Voice Message Sender Identity against a plurality of telephone numbers John Smith uses.

In one embodiment, Voice Message Analyzer 710 answers the query "Who has sent a voice message to telephone extension number 3325?" Voice Message Analyzer 710 selects from Datastore 750 all Voice Message Record with Voice Message Recipient Identity that matches telephone extension number "3325", and that includes a Voice Message Action Record with Voice Message Action of Action Send. Voice Message Analyzer 710 extracts from the selected zero or more Voice Message Record the Voice Message Sender Identity as the result of the analysis.

In another embodiment, Voice Message Analyzer 710 retrieves a "list of voice messages being sent during the half hour before 3 p.m., Jun. 29, 2005, the closing time for the New York Stock Exchange." Voice Message Analyzer 710 selects from Datastore 750 all Voice Message Record that includes a Voice Message Action Record with Voice Message Action Time between 2:30 p.m., and 3 p.m., on Jun. 29, 2005, and with Voice Message Action of Action Send. Voice Message Analyzer 710 retrieves from the selected zero or more Voice Message Record the Voice Message as the result of the analysis.

In one embodiment, Voice Message Analyzer 710 answers the query "Did Maria Anderson listen to a voice message from telephone number "408-234-5678" on Jul. 10, 2001?" Voice Message Analyzer 710 selects from Datastore 750 all Voice Message Record that includes Voice Message Recipient Identity matching the name "Maria Anderson" and Voice Message Sender Identity matching the telephone number "408-234-5678", and that includes a Voice Message Action Record with Voice Message Action of Action Listen, and with Voice Message Action Time matching Jul. 10, 2001. If one or more Voice Message Record is selected, Voice Message Analyzer 710 indicates a "yes" as the result of the analysis. If no Voice Message Record is selected, Voice Message Analyzer 710 indicates a "no" as the result of the analysis.

In yet another embodiment, Voice Message Analyzer 710 retrieves a "list of senders who had mentioned the word "Enron" and "short sell" in a voice message he or she sent on Aug. 17, 2003?" Voice Message Analyzer 710 selects from Datastore 750 all Voice Message Record that includes Voice Message containing the audio patterns of "Enron" and "short sell", and that includes a Voice Message Action Record with Voice Message Action of Action Send, and with Voice Message Action Time matching "Aug. 17, 2003". Voice System retrieves from the selected zero or more Voice Message Record the Voice Message Sender Identity as the result of the analysis.

In one other embodiment, Voice Message Analyzer 710 answers the query "Among those who has listened to a voice message from John Smith on May 20, 2005, who has sent a voice message to the telephone number 408-222-3333 on May 20, 2005 or May 21, 2005?" Voice Message Analyzer 1010 selected from Datastore 750 a first group of Voice Message Record that includes Voice Message Sender Identity matching the name "John Smith" and that includes a Voice Message Action Record with Voice Message Action of Action Listen and with Voice Message Action Time matching "May 20, 2005". Voice Message Analyzer 710 extracts the Voice Message Recipient Identity from the first group of Voice Message Record. Voice Message Analyzer 710 selects from Datastore 750 a second group of Voice Message Record that includes Voice Message Recipient Identity matching the telephone number "408-222-3333", and that includes Voice Message Sender Identity matching one of the extracted Voice Message Recipient Identity, and that includes a Voice Message Action Record with Voice Message Action of Action Send and with Voice Message Action Time matching "May 20, 2005" or "May 21, 2005". Voice Message Analyzer 710 retrieves from the second group of Voice Message Record the Voice Message Sender Identity as the result of the analysis.

In one embodiment, Voice Message Analyzer 710 retrieves a "list of all voice messages of Dave Leach's family, where Dave's family's phone numbers are 408-123-3456, 650-233-4455, and 650-233-6890". Voice Message Analyzer 710 selects from Datastore 750 a first group of Voice Message Record with Voice Message Recipient Identity that matches "Dave Leach", and with Voice Message Sender Identity that matches one of Dave's family's phone numbers, and that includes a Voice Message Action Record with Voice Message Action of Action Receive. Voice Message Analyzer 710 further selects from Datastore 750 a second group of Voice Message Record with Voice Message Sender Identity that matches "Dave Leach", and with Voice Message Recipient Identity that matches one of Dave's family's phone numbers, and that includes a Voice Message Action Record with Voice Message Action of Action Send. Voice Message Analyzer 710 retrieves from the first group and the second group of Voice Message Record the Voice Message as the result of the analysis.

In one embodiment, Voice Message Analyzer 710 retrieves "list of all voice messages that match a pattern of being sent to competitors within 24 hours of a board meeting." Voice Message Analyzer 710 selects from Datastore 750 a group of Voice Message Records with Voice Message Recipient Identity that matches a list of competitors, with Voice Message Action Time within 24 hours of a date and time of a board meeting, and that includes a Voice Message Action of Action Sent. The Voice Message Analyzer 710 retrieves from this group of Voice Message Records the Voice Message Sender Identity.

The analysis illustrated in FIG. 7 represents examples regarding usage information. It will be evident to skilled in the art to formulate similar analysis in order to provide other results regarding usage information.

FIG. 8 illustrates a process of reporting on a plurality of Voice Message Records.

Voice Message System includes a Voice Message Reporter 830. In one embodiment, Voice Message Reporter 830 instructs Voice Message Analyzer 810 to conduct an analysis. In one embodiment, Voice Message Reporter 830 instructs the Voice Message Analyzer 850 based on a Report Specification.

In one embodiment, a Report Specification is based on corporate usage policies. In another embodiment, a Report Specification is based on governmental usage regulations. In another embodiment, a Report Specification is based on public service usage policies.

In one embodiment, a Report Specification includes an analysis to be conducted in order to generate a report. In another embodiment, a Report Specification includes a format of a report. In yet another embodiment, a Report Specification includes a method to publish a report. In one other embodiment, a Report Specification includes timing information. In one embodiment, the timing information includes a scheduled time to generate a report, such as 5 pm on Jul. 26, 2005, daily at 6 am, or every hour during business days. In one embodiment, Voice Message Reporter 830 includes a clock. In one embodiment, Voice Message Reporter 830 instructs Voice Message Analyzer 810 to conduct an analysis included in a Report Specification when the time of day indicated by the clock matches the timing information in the Report Specification.

In one embodiment, Voice Message Reporter 830 connects to a Report Specification Datastore 890. Report Specification 890 stores a plurality of Report Specification. In one embodiment, Voice Message Reporter 830 retrieves a Report Specification from Report Specification Datastore 890. In one embodiment, Voice Message Reporter 830 instructs Voice Message Analyzer 810 to conduct the analysis included in the retrieved Report Specification. In one embodiment, Voice Message Reporter 830 receives the result of the analysis to generate a report. In one embodiment, Voice Message Reporter 830 generates the report based on the format and publishing method included in the Report Specification.

In another embodiment, an operator submits a Report Specification to Voice Message Reporter 830. In one embodiment, Voice Message Reporter 830 instructs Voice Message Analyzer 810 to conduct the analysis included in the submitted Report Specification.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for providing a voice message service to a user, comprising:
   (a) in response to the user sending a first voice message:
      (a1) creating, by a computing system, a first voice message record for the first voice message;
      (a2) marking the user as a first sender of the first voice message;
      (a3) sending the first voice message to a recipient; and
      (a4) recording in the first voice message record, by the computing system, a first send action for the sending of the first voice message by the first sender and a first receive action for receiving the first voice message by the recipient;
   (b) in response to the user receiving a second voice message from a second sender:
      (b1) creating, by the computing system, a second voice message record for the second voice message; and
      (b2) recording in the second voice message record, by the computing system, a second send action for the sending of the second voice message by the second sender and a second receive action for the receiving of the second voice message by the user; and
   (c) in response to a query from the user, retrieving the first voice message record and the second voice message record.

2. The method of claim 1, wherein the first voice message record comprises a first timestamp for the first send action or the first receive action, wherein the second voice message record comprises a second timestamp for the second send action or the second receive action.

3. The method of claim 2, wherein the query comprises a name, wherein the retrieving (c) comprises:
   (c1) in response to determining that the recipient and the second sender matches the name, generating a report comprising the first voice message record and the second voice message record according to an order of the first and second timestamps.

4. The method of claim 3, wherein the retrieving (c) further comprises:
   (c2) storing the generated report in a storage medium.

5. The method of claim 1, wherein the first voice message record comprises a first location or the second voice message record comprises a second location.

6. The method of claim 5, wherein the first location comprises a location of the recipient or the second location comprises a location of the second sender.

7. The method of claim 1, wherein the query comprises a location criteria, wherein the retrieving (c) comprises:
   (c1) in response to determining that the first voice message record matches the location criteria, retrieving the first voice message record; and
   (c2) in response to determining that the second voice message record matches the location criteria, retrieving the second voice message record.

8. A system, comprising:
   a datastore for storing a plurality of voice message records; and
   a voice message system, wherein the voice message system:
   (a) in response to the user sending a first voice message:
      (a1) creates a first voice message record of the plurality of voice message records for the first voice message;
      (a2) marks the user as a first sender of the first voice message;
      (a3) sends the first voice message to a recipient; and
      (a4) records in the first voice message record a first send action for the sending of the first voice message by the first sender and a first receive action for receiving the first voice message by the recipient;
   (b) in response to the user receiving a second voice message from a second sender:
      (b1) creates a second voice message record of the plurality of voice message records for the second voice message; and
      (b2) records in the second voice message record a second send action for the sending of the second voice message by the second sender and a second receive action for the receiving of the second voice message by the user; and
   (c) in response to a query from the user, retrieves the first voice message record and the second voice message record.

9. The system of claim 8, wherein the first voice message record comprises a first timestamp for the first send action or the first receive action, wherein the second voice message record comprises a second timestamp for the second send action or the second receive action.

10. The system of claim 9, wherein the query comprises a name, wherein in the retrieves (c), the voice message system:
   (c1) in response to determining that the recipient and the second sender matches the name, generates a report comprising the first voice message record and the second voice message record according to an order of the first and second timestamps.

11. The system of claim 10, wherein in the retrieves (c), the voice message system further:
   (c2) stores the generated report in a storage medium.

12. The system of claim 8, wherein the first voice message record comprises a first location or the second voice message record comprises a second location.

13. The system of claim 12, wherein the first location comprises a location of the first sender or the second location comprises a location of the user.

14. The system of claim 8, wherein the query comprises a location criteria, wherein in the retrieves (c), the voice message system:
   (c1) in response to determining that the first voice message record matches the location criteria, retrieves the first voice message record; and
   (c2) in response to determining that the second voice message record matches the location criteria, retrieves the second voice message record.

15. A non-transitory computer readable medium comprising computer readable program instructions for providing a voice message service to a user, wherein the computer readable program instructions when executed by a computer causes the computer to:
   (a) in response to the user sending a first voice message:
      (a1) create a first voice message record for the first voice message;
      (a2) mark the user as a first sender of the first voice message;
      (a3) send the first voice message to a recipient; and
      (a4) record in the first voice message record a first send action for the sending of the first voice message by the first sender and a first receive action for receiving the first voice message by the recipient;
   (b) in response to the user receiving a second voice message from a second sender:
      (b1) create a second voice message record for the second voice message; and
      (b2) record in the second voice message record a second send action for the sending of the second voice message by the second sender and a second receive action for the receiving of the second voice message by the user; and
   (c) in response to a query from the user, retrieve the first voice message record and the second voice message record.

16. The medium of claim 15, wherein the first voice message record comprises a first timestamp for the first send action or the first receive action, wherein the second voice message record comprises a second timestamp for the second send action or the second receive action.

17. The medium of claim 16, wherein the query comprises a name, wherein the retrieve (c) comprises:
   (c1) in response to determining that the recipient and the second sender matches the name, generate a report comprising the first voice message record and the second voice message record according to an order of the first and second timestamps.

18. The medium of claim 17, wherein the retrieve (c) further comprises:
   (c2) store the generated report in a storage medium.

19. The medium of claim 15, wherein the first voice message record comprises a first location or the second voice message record comprises a second location.

20. The medium of claim 15, wherein the query comprises a location criteria, wherein the retrieve (c) comprises:
   (c1) in response to determining that the first voice message record matches the location criteria, retrieve the first voice message record; and
   (c2) in response to determining that the second voice message record matches the location criteria, retrieve the second voice message record.

21. A method for providing a voice message service associated with a sender, comprising:
   (a) storing a plurality of voice message records by a sending voice message computing system, wherein each of the voice message records comprises a voice message, a send action corresponding to the sender of the voice message, and one or more receive actions corresponding to one or more recipients of the voice message;
   (b) receiving a criteria about a user;
   (c) matching the criteria to one or more of the plurality of voice message records, comprising:
      (c1) identifying the sender or a recipient in the one or more of the plurality of voice message records matching the criteria; and (d) generating, by the sending voice message computing system, a report based on the one or more of the plurality of voice message records matching the criteria.

22. The method of claim 21, wherein the criteria comprise one or more of the following: a time; a name; a word; an audio pattern; and a location.

23. The method of claim 21, wherein the criteria is related to one or more of the following: a corporate policy; government regulation; a usage policy; a service policy; and a business event.

24. A non-transitory computer readable medium comprising computer readable program instructions for providing a voice message service to a sender, wherein the computer readable program instructions when executed by a computer causes the computer to:
 (a) store a plurality of voice message records by a sending voice message system, wherein each of the voice message records comprises a voice message, a send action corresponding to the sender of the voice message, and one or more receive actions corresponding to one or more recipients of the voice message;
 (b) receive a criteria about a user;
 (c) match the criteria to one or more of the plurality of voice message records, comprising:
  (c1) identifying the sender or a recipient in the one or more of the plurality of voice message records matching the criteria; and
 (d) generate a report based on the one or more of the plurality of voice message records matching the criteria by the sending voice message system.

25. The medium of claim 24, wherein the criteria comprise one or more of the following: a time; a name; a word; an audio pattern; and a location.

26. The medium of claim 24, wherein the criteria is related to one or more of the following: a corporate policy; government regulation; a usage policy; a service policy; and a business event.

\* \* \* \* \*